(12) United States Patent
Skipper et al.

(10) Patent No.: US 10,089,482 B2
(45) Date of Patent: Oct. 2, 2018

(54) ENFORCEMENT MITIGATIONS FOR A PROTECTED FILE

(71) Applicant: DELL PRODUCTS L.P., Round Rock, TX (US)

(72) Inventors: Chad Skipper, Granger, TX (US); Elliot D. Lewis, Henderson, NV (US); David Konetski, Austin, TX (US); Christopher Burchett, Lewisville, TX (US); Richard William Schuckle, Austin, TX (US); James Michael Burke, Frisco, TX (US); Warren Wade Robbins, Celina, TX (US); Carrie Elaine Gates, Livermore, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 114 days.

(21) Appl. No.: 14/975,474

(22) Filed: Dec. 18, 2015

(65) Prior Publication Data
US 2017/0039378 A1 Feb. 9, 2017

Related U.S. Application Data

(63) Continuation of application No. 14/819,322, filed on Aug. 5, 2015.

(51) Int. Cl.
*G06F 17/00* (2006.01)
*G06F 21/62* (2013.01)
(Continued)

(52) U.S. Cl.
CPC ........ *G06F 21/6209* (2013.01); *G06F 21/604* (2013.01); *H04L 63/10* (2013.01); *H04L 63/20* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 6,272,632 B1 * | 8/2001 | Carman | G06F 21/602 380/277 |
| 7,155,466 B2 | 12/2006 | Rodriguez | |

(Continued)

OTHER PUBLICATIONS

Elliot Lewis et al., "The Network Alone Can't Protect Your Data," RSA Conference, Feb. 24-28, 2014, Moscone Center, San Francisco, CA, Printed from the internet: URL: http://www.rsaconference.com/media/the-network-alone-cant-protect-your-data, 2014 (14pgs), and video available at https://youtu.be/5ekpLgcSAc0 or https://www.youtube.com/watch?v=5ekpLgcSAc0&feature=youtu.be. (1 page).

(Continued)

*Primary Examiner* — Morshed Mehedi
(74) *Attorney, Agent, or Firm* — North Weber & Haugh LLP

(57) ABSTRACT

Aspects of the present invention provide the ability to enforce access methods on data based upon a policy or policies identified within the metadata of a file. The data is self-protected by including or being wrapped with one or more policy/rule identifiers that act as a form of body armor to the data when in transit or in different situations. In embodiments, access is only granted upon successful authentication and compliance with the identified policy or policies. In embodiments, depending upon the conditions and policies, varying level access may be granted. In embodiments, depending upon the conditions and policies, the system may take one or more mitigations or remedial access levels, such as containerizing, sandboxing, granting limited access, or erasing the data.

20 Claims, 11 Drawing Sheets

(51) Int. Cl.
*H04L 29/06* (2006.01)
*G06F 21/60* (2013.01)

(56) References Cited

U.S. PATENT DOCUMENTS

| | | | |
|---|---|---|---|
| 7,171,431 B2 | 1/2007 | Shimizu | |
| 7,380,120 B1 | 5/2008 | Garcia | |
| 8,364,984 B2 | 1/2013 | Jeffries | |
| 9,135,444 B2 | 9/2015 | Carter | |
| 9,300,640 B2 | 3/2016 | Pate | |
| 9,460,177 B1 | 10/2016 | Pawar | |
| 9,619,242 B2 | 4/2017 | Khosravi | |
| 9,715,590 B2 | 7/2017 | Gardner | |
| 2004/0015723 A1 | 1/2004 | Pham | |
| 2006/0010317 A1 | 1/2006 | Lee | |
| 2006/0026219 A1 | 2/2006 | Orenstein | |
| 2006/0059117 A1* | 3/2006 | Tolson | G06F 21/604 |
| 2006/0120526 A1* | 6/2006 | Boucher | G06F 21/6218 380/247 |
| 2008/0120699 A1 | 5/2008 | Spear | |
| 2009/0013406 A1 | 1/2009 | Cabuk | |
| 2009/0037686 A1 | 2/2009 | Mendonca | |
| 2009/0282077 A1 | 11/2009 | Thomas | |
| 2010/0146582 A1 | 6/2010 | Jaber | |
| 2011/0119481 A1* | 5/2011 | Auradkar | G06F 21/6209 713/150 |
| 2011/0247074 A1 | 10/2011 | Manring | |
| 2012/0072731 A1 | 3/2012 | Winograd | |
| 2013/0132330 A1 | 5/2013 | Hurwitz | |
| 2013/0212395 A1* | 8/2013 | D'Souza | H04L 9/0825 713/171 |
| 2013/0219176 A1 | 8/2013 | Akella | |
| 2013/0346455 A1 | 12/2013 | Prasad | |
| 2014/0040331 A1 | 2/2014 | Takaoka | |
| 2014/0067864 A1 | 3/2014 | Holland | |
| 2014/0143430 A1 | 5/2014 | Andrews | |
| 2014/0201526 A1 | 7/2014 | Burgess | |
| 2014/0208090 A1 | 7/2014 | Anson | |
| 2014/0208108 A1* | 7/2014 | Lester | H04L 9/0825 713/168 |
| 2015/0095473 A1 | 4/2015 | Goetsch | |
| 2015/0324593 A1* | 11/2015 | Abuelsaad | H04W 12/02 713/152 |
| 2016/0078245 A1 | 3/2016 | Amarendran | |
| 2016/0253509 A1* | 9/2016 | Wibran | G06F 21/6209 |
| 2016/0335445 A1 | 11/2016 | Stephens | |

OTHER PUBLICATIONS

Final Office Action dated Jan. 23, 2018, in related U.S. Appl. No. 14/975,567 (45 pgs).
Final Office Action dated Feb. 22, 2018, in related U.S. Appl. No. 14/819,322 (36 pgs).
Response filed Apr. 23, 2018, in related U.S. Appl. No. 14/975,567 (12 pgs).
Non-Final Office Action dated Sep. 7, 2017, in related U.S. Appl. No. 14/819,322 (44 pgs).
Non-Final Office Action dated Aug. 30, 2017, in related U.S. Appl. No. 14/975,567 (32 pgs).
Response filed Nov. 30, 2017, in related U.S. Appl. No. 14/975,567 (21 pgs).
Response filed Dec. 7, 2017, in related U.S. Appl. No. 14/819,322 (26 pgs).
Applicant-Initiated Interview Summary dated Apr. 30, 2018, in related U.S. Appl. No. 14/819,322 (20 pgs).

* cited by examiner

ENFORCEMENT MITIGATIONS FOR A PROTECTED FILE

CROSS-REFERENCE TO RELATED APPLICATIONS

This application claims the benefit of and claims priority as a continuation to co-pending and commonly-owned U.S. patent application Ser. No. 14/819,322, filed on Aug. 5, 2015, entitled "SYSTEMS AND METHODS FOR PROVIDING SECURE DATA,".

This patent application is related in subject matter to co-pending and commonly-owned U.S. patent application Ser. No. 14/975,567, filed on Dec. 18, 2015, entitled "PLATFORM FOR ADOPTING SETTINGS TO SECURE A PROTECTED FILE," which patent document is incorporated by reference herein in its entirety and for all purposes.

All of the aforementioned patent documents are hereby incorporated by reference in their entirety as if fully included herein.

TECHNICAL FIELD

The present disclosure relates to data handling. More particularly, the present disclosure related to systems and methods for improving the secure handling of data.

DESCRIPTION OF THE RELATED ART

As the value and use of information continues to increase, individuals and businesses seek additional ways to process and store information. One option available to users is information handling systems. An information handling system (or computing system) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Along with the increased use of information handling systems has come the dramatic increase in the amount and use of data. Unfortunately from a security perspective, data has a tendency to be borderless and to leak. In today's world of mobile data, data can reside almost anywhere and on any system.

With the spread of mobile devices and cloud-enabled software, the ability to protect data has become increasingly difficult. Prior to the advent of mobility and cloud solutions, data could be protected by "hardening" the network perimeter and making sure that data only became available to corporate-owned, corporate-controlled assets, such as company servers, laptops, and desktops. Also, data was only previously accessed and handled by datacenter-based applications and storage solutions. In these traditional or "classic" models of datacenter and corporate-controlled endpoints, data could be kept under control by locking down the perimeter of the network and "walling off" the data from the outside world.

FIG. 1 depicts the typical or classic network operational model. As shown in FIG. 1, data was completely contained on corporate assets within a singular network design. Data needed to be accessed within the corporate infrastructure 105 either directly from corporate-managed clients 115 via secure connections (e.g., VPN 120 via a demilitarized zone 110).

This model has drastically changed in the last few years to encompass cloud-based solutions for application access, storage, inter-company operations, and data exchange. The idea of controlling data has become much more difficult, as the nature of data today is to "leak" beyond the corporate control.

Furthermore, with the pervasive expansion of "Bring-Your-Own-Device" scenarios (in which personally-owned devices are used in corporate settings and on which corporate-owned data can arrive and be stored), cloud-based applications, cloud-based storage solutions, partner networks, and beyond, the traditional or classic models of containing data and trying to prevent it from leaking from the network are outdated and ineffective.

Accordingly, what is needed are systems and methods that provides the ability to enforce access methods on data based upon injected policy or policies within the metadata of the file.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
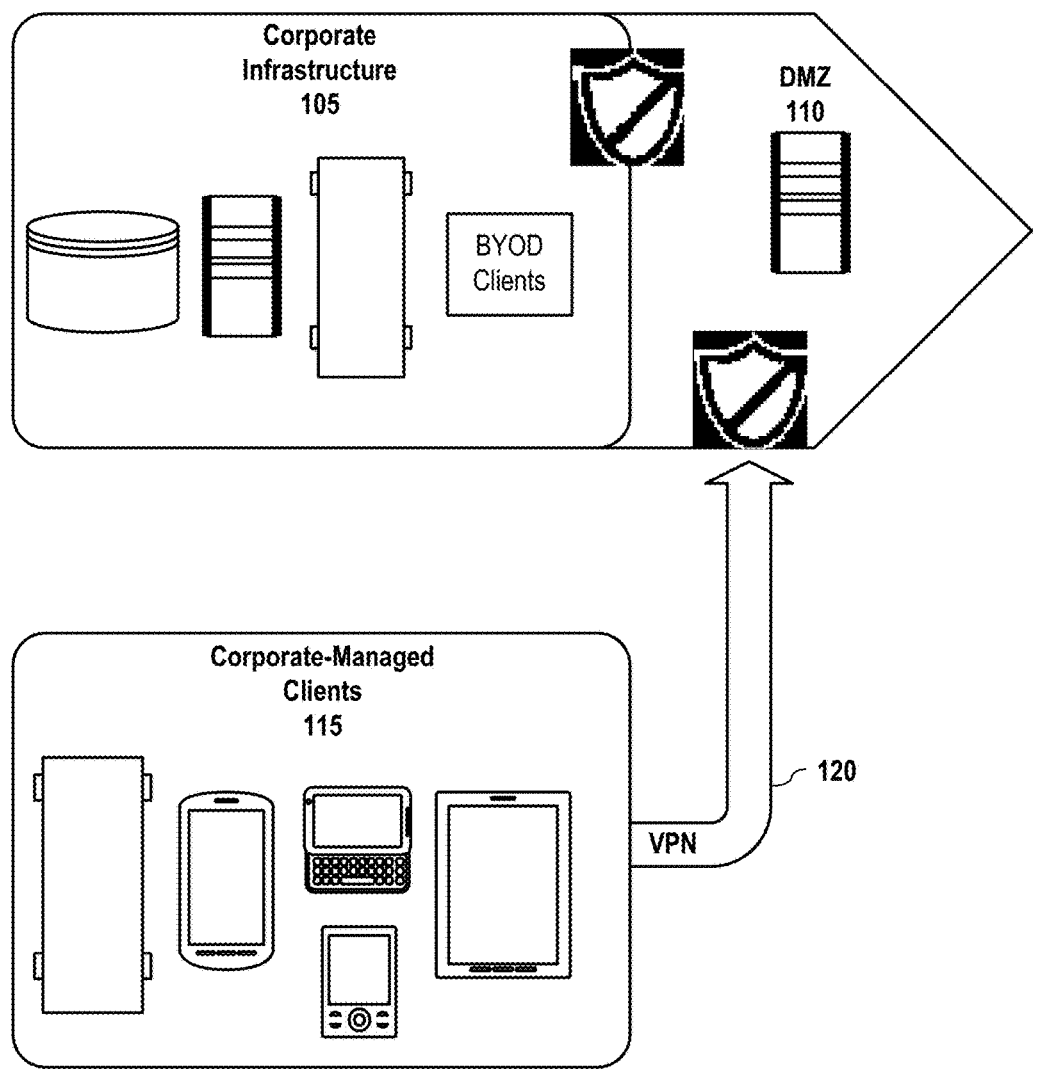
FIG. 1 ("FIG. 1") depicts the typical or classic network operational model, in which data was completely contained on corporate assets within a singular network design.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," "segment," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Maintaining data security is an important issue that is becoming increasingly more complex. Previous attempts to address this issue typically fall within two categories. As discussed above the classic model is to control the location of the data. Another category relates to application-level security. Each one can imbed information into a data file in a particular way that will keep the file from being accessed without permissions. However, these application-level approaches have significant shortcomings.

Consider, by way of comparison, an application-level encryption of files, such as Adobe Acrobat files, which have been password-protected. In this case, the file is encrypted and only readable if the Adobe Reader software is present and the user knows the password. Assuming, for sake of argument, that a password requirement might be considered a "policy," it is at best a static password policy. Acrobat files have no the ability to create and implement any complex policies.

In contrast, embodiments of the present invention allow files to assess their current environment for conditions, such as, by way of illustration only, validation of identity, system OS, device type, network detection, etc. and use this information in assessing complex policies. Furthermore, embodiments of the present invention allow for multiple methods of access beyond simple decryption. This approach comprises a much more complex and comprehensive policy assessment capability than just a simple password.

Also consider, by way of comparison, Microsoft Digital Rights Management (DRM), which works on an application level. The DRM works with Microsoft Office to apply certain access and control rights to an Office document (e.g., .docx, .xlsx, .pptx, etc.) by applying a wrapper that has a policy applied to it using XrML (eXtensible Rights Markup Language) coding that can be authorized for access using Microsoft Active Directory Group Policy Object (GPO) coding. To be able to access a Microsoft DRM-enabled file, the file must be accessed using a Microsoft DRM-enabled application (e.g., Microsoft Office applications such as Word, Powerpoint, Excel, Outlook). The application reads the XrML policies and applied controls and restrictions embedded in the application level.

However, once again there are several key differences between embodiments of the present invention and Microsoft DRM. First, in embodiments, XrML is not used for the encoded policy. Second, the data secured according to embodiments of the present invention are not dependent upon Microsoft applications to read the policy. Third, the policy or policies of the present invention affect what the application can do with the file in question, which is a key differentiator from Microsoft DRM. Embodiments of the present invention work at a data file level and are independent of Microsoft Office, Microsoft Active Directory, and Microsoft Group Policy Object (GPO). Fourth, Microsoft DRM only works on Microsoft-based Windows and Office systems; whereas embodiments of the present invention are platform and application agnostic.

Unlike embodiments of the present invention, these prior approaches do not embed policy or policies into the data files; nor do they perform any interactive investigation of the current environment conditions and heuristics to make complex decisions on various factors, such as, by way of example: (1) whether a file will decrypt under the current conditions or stay encrypted; (2) if the decision is for the local file to stay encrypted, will the policy of the file allow for access to the data under another means (i.e., viewing another copy of the file virtually in a different location, under a secure container on a mobile device, etc.); and (3) if the decision is not to allow access, should the data file destroy itself in place and remove itself from the current environment without allowing any access.

To enable the original owner of data to maintain control of their data no matter where it goes, what it is accessed on, under any circumstances, embodiments of the present invention provide data the ability to do several actions, including but not limited to:

(1) The data can be encrypted at all times in order to protect itself from unauthorized access;

(2) The data can carry with it a set of policy controls/rules that define for the data at any time how, when, on what, and by whom it can be accessed;

(3) The data has tools available to assess its current environment and situation, and apply the heuristics of its current situation against an on-board policy controls/rules to determine whether it should allow access to itself;

(4) The data—in conjunction with a reader software—is able to deny access to itself entirely if its on-board policy does not allow for the current conditions;

(5) The data—in conjunction with the reader software—is able to determine, from multiple options, exactly how it can be viewed under the current conditions;

(6) The data—in conjunction with the reader software—is able to destroy itself if the current environment is not within the parameters set by the on-board policy; and (7) The data—in conjunction with the reader software—is able to report back to the original owner of the data what its current conditions are and provide intelligence as to where it is, on what system it resides, who is trying to access it.

Figure 2:
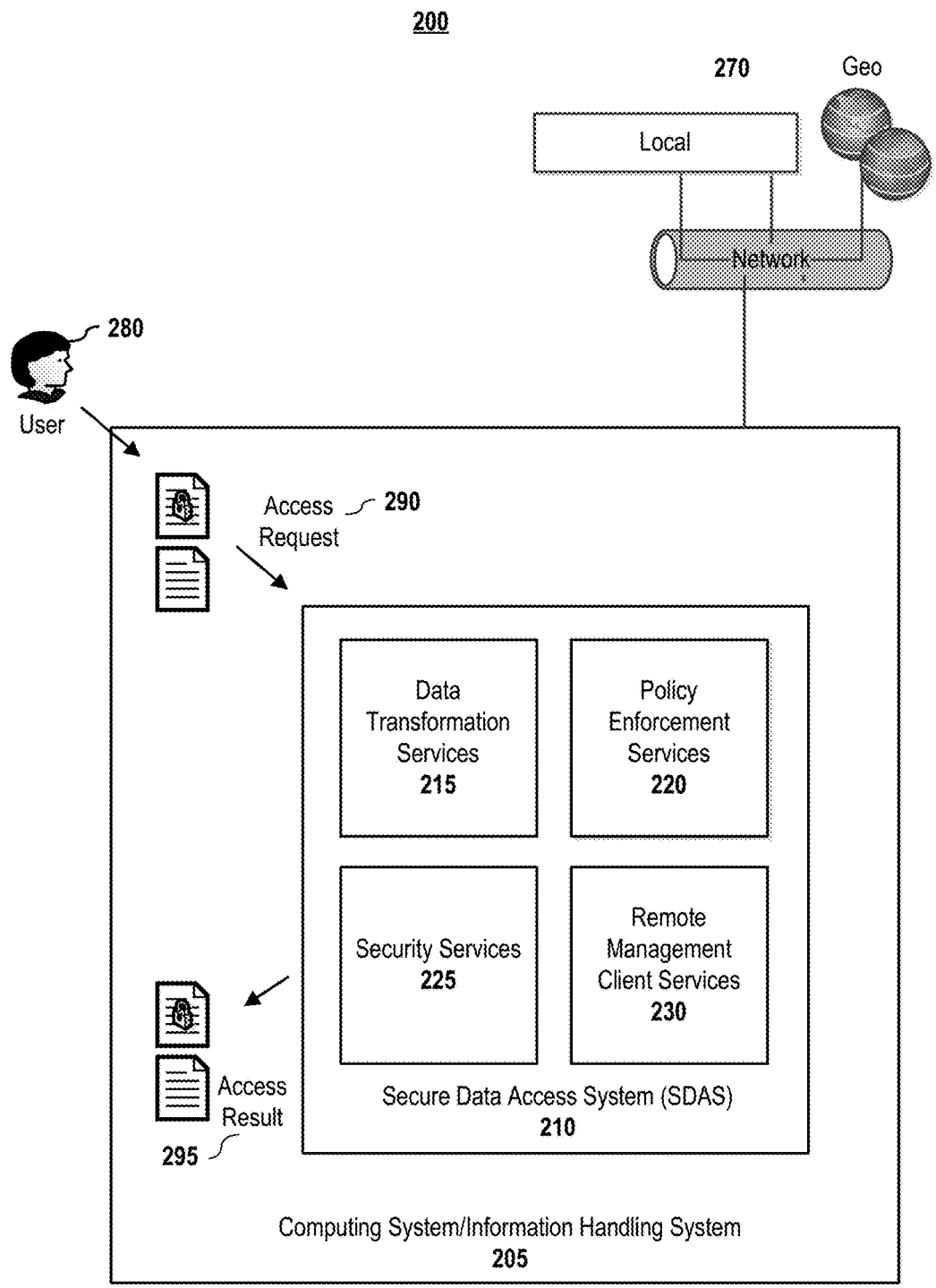
FIG. 2 depicts a high-level block diagram of a system that provides data security according to embodiments of the present invention.

FIG. 2 depicts a high-level block diagram of a system that provides data security according to embodiments of the present invention. As shown in FIG. 2, the secure data access system (SDAS) 210 is resident on a computing device/information handling system 205. In embodiments, the SDAS 210 may comprise data transformation services 215, policy enforcement services 220, security services 225, and remote management client services 230. And, in embodiments, the device 205 may be connected to one or more networks (e.g., local and/or geographic networks 270). Embodiments of system components that perform these various services are presented with respect to FIG. 3—although it shall be noted that other configuration may also be used.

B. System Embodiments

Figure 3:
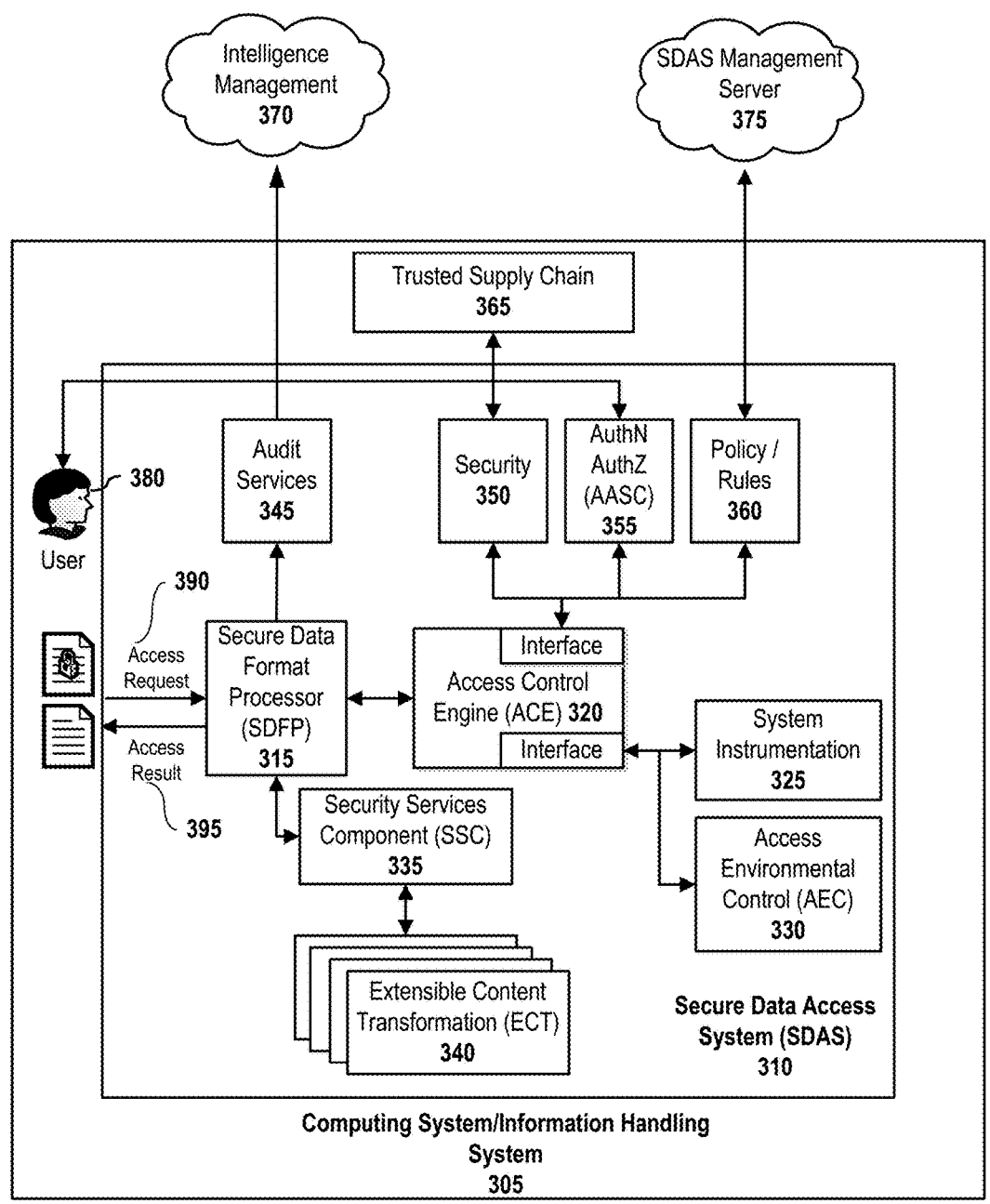
FIG. 3 depicts a block diagram of a system that provides data security according to embodiments of the present invention.

FIG. 3 depicts a block diagram of a system that provides data security according to embodiments of the present invention. As shown in FIG. 3, the system 310 is resident on a computing device/information handling system 305. In embodiments, a secure data access system (SDAS) 310 comprises a secure data format processor (SDFP) 315, an access control engine (ACE) 320, system instrumentation 325, access environmental control (AEC) 330, a security services component (SSC) 335, one or more extensible content transformation (ECT) modules 340, an audit services module 345, a security module 350, an authentication/authorization security component (AASC) 355, and policy/rules module 360. In embodiments the secure data access system operates 310 on a computer system 305 and may operate in conjunction with a trusted supply chain module 365. As shown in FIG. 3, in embodiments, the SDAS 310 is also communicatively coupled to an intelligence management server 370 and an SDAS management server 375. The function of each of these components is described in more detail below.

1. Secure Data Format (SDF)

In embodiments, the data uses a secure data format (SDF), which is a format specification that supports the SDAS. In embodiments, the SDF format may be a Resource Interchange File Format (RIFF)-based file format. In embodiments, this format is an extension of the standardized RIFF (Resource Interchange File Format) specification with additions supporting content integrity verification, encryption, embedded policies, audit data, and other SDAS manifests and metadata. In embodiments, files of this format type may have an extension of ".sdf"—although other file extensions names may be used. This file format allows the data to be self-protecting; that is, the policies/rules about that data travel with the data.

Figure 10:
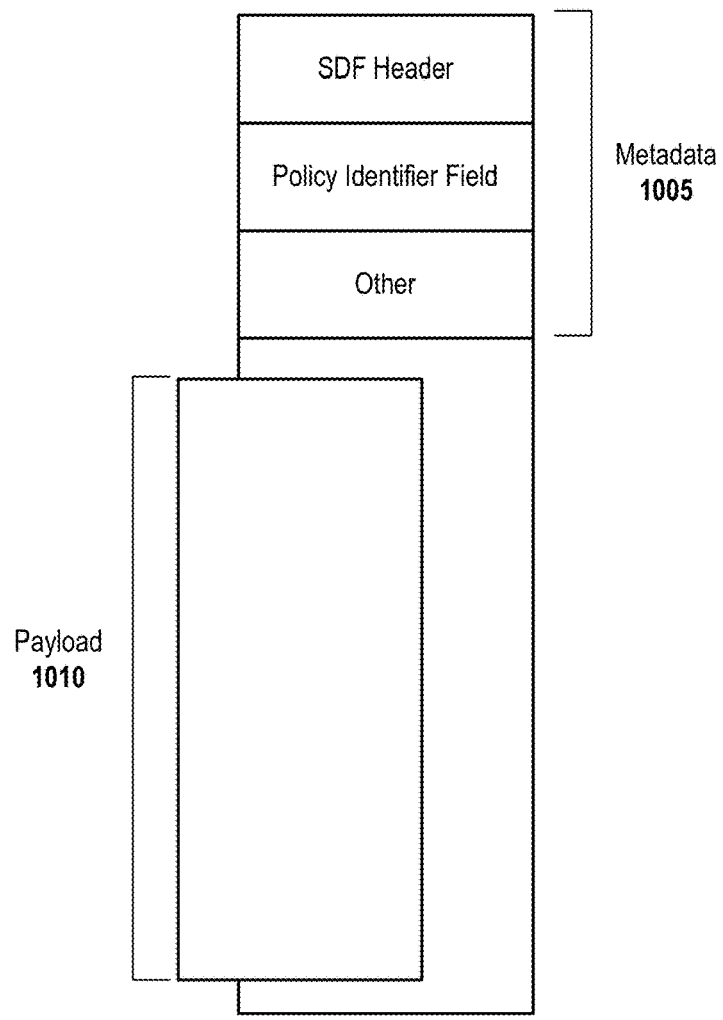
FIG. 10 depicts an example secure data file structure according to embodiments of the present invention.

FIG. 10 depicts an example secure data file structure according to embodiments of the present invention. In embodiments, the .SDF file structure generally comprises to main types of data, metadata 1005 and payload data 1010—although other fields may also be present. In embodiments, the format is extensible to allow for future expansion to include data within a field, to include additional data fields, or both.

In embodiments, the metadata 1005 sections may include various fields, such as: an SDF header that comprises information related to the file, which may include information that describes one or more of who, what, when, and where data; a policy/policy identifier field that comprises one or more injected policies or references to policies. In embodiments, the metadata 1005 may contain one or more other fields.

One skilled in the art shall recognize that numerous types of metadata information may be included in the fields. For example, in embodiments, the metadata may support features or provide information regarding: integrity and tampering checksums, embedded encryption key material or encryption key references, encrypted original filename, Adobe Extensible Metadata Platform (XMP) metadata, file descriptors (e.g., creation time, last access, last write, file size, etc.), embedded policies or references to policies that reside on a server, etc.

In embodiments, the payload 1010 is encrypted data (e.g., an encrypted file), which may be encrypted using any of a number of well-known algorithms (e.g., AES-256) and may use a key that is embedded in the SDF metadata or a key stored on the server referenced by a unique ID stored in the SDF metadata. In embodiments, the file may be a nested file in which the payload is an SDF file.

Embodiments of the present invention will allow files to be assessed based upon a myriad of heuristics and situational conditions to determine who, how, when, and under what conditions a file can be accessed, if at all. Presented below is an embodiment of an architecture for assessing file accessibility:

(1) Contextual access assessment comprising one or more of: (a) Identification processing; (b) Endpoint platform assessment; and (c) Connection allowance assessment;

(2) Identity management & data access policy comprising one or more of: (a) Identity verification; (b) Policy selection; (c) Stateful classification access assessment; (d) Resultant Set of Policy Resolution (RSOP); and (e) Policy conflict resolution;

(3) Enforcement controls comprising one or more of: (a) Firewall; (b) DLP (Data Loss Prevention); (c) AV/AM (Anti-Virus/Anti-Malware); (d) Network segmentation; (e) Sandboxing; (f) Containerization; (g) Virtual Private Network (VPN); (h) Virtualization; and (i) Secure browser;

(4) Encryption Processing comprising one or more of: (a) Key management; (b) Platform assessment; (c) Decryption processing; (d) Encryption processing; (e) Key storage; and (f) Process closure;

All of the above items flow into Intelligence management comprising one or more of: (a) Audit/compliance; (b) Mitigation selection, activation & monitoring; (c) Ongoing monitoring & policy adherence; (d) Data integrity monitoring; and (e) Session monitoring & closure control.

Some or all of these items discussed above may be considered and have enforced control(s) that are considered regarding whether a file should be accessed. In embodiments, one mechanism for achieving this result is to imbedded policy data in the file encryption wrapper. Then, in embodiments, a reader application can assess the policies and the situation of the file in conjunction with the systems around it to determine whether or not to allow access or to allow a certain type of access.

2. SDAS Management Server (375)

In embodiments, the secure data access system (SDAS) 310 is communicatively coupled to and operates under the direction and authority of a management server 375. In embodiments, the server 375 may be located on premise or may be hosted, such as in platform-as-a-service (PaaS) resources. In embodiments, the server 375 is where an administrator manages such items as policies, users and user group settings, and centralized audit data. In embodiments, it is also the security manager responsible for data such as keys, certificates, and certain authentication and authorization-related controls.

3. Secure Data Format Processor (SDFP)

In embodiments, the secure data format processor (SDFP) 315 is responsible for reading and writing secure data format content (e.g., .SDF files). In embodiments, the processor 315 is communicatively coupled to and collaborates with the other system components to ultimately transform clear, unprotected content into protected content and vice versa.

4. Extensible Content Transformation (ECT)

In embodiments, the extensible content transformation module(s) 340 is communicatively coupled to the secure data format processor 315 via a security services component 335 and provide a mechanism for extending the transformative capabilities of the secure data format processor 315 by adding one or more trusted program modules to the system 310. In embodiments, these modules 340 embody programmatic capabilities for transforming data according to rules of a larger system. By way of illustration and not limitation, one ECT 340 may deliver content analysis and filtering/tokenization, while another ECT 340 may offer compression. This capability allows for multiple ECTs 340 to operate in concert but in an order or sequence. In embodiments, that sequence is expressed or recorded in the metadata of the SDF content upon creation/update and must be honored in reverse order to transform secure content to a viewable or usable format.

5. Access Control Engine (ACE)

In embodiments, the access control engine (ACE) 320 component is communicatively coupled to the secure data format processor 315 and is responsible for analyzing specific protection policies or rules. In embodiments, the ACE 320 also is responsible for evaluating the current situational characteristics of an operational request (e.g., encode/decode, protect for access, provide one or more alternative access means, or protect specific access content). In embodiments, the results of its evaluation are made available to the SDFP 315 and other system components responsible for controlling the access experience, which may include allowing access, denying access, and enforcing policy directives such as content or key deletions.

Given that the Secure Data Access System can understand the data format, it understands the transformation of the data and can communicate with all the services components. The system wants to analyze the specific protection policies or rules that came with and are protecting that data. Recall that the data is self-protecting and protects itself as its going anywhere in transit, like body armor for a soldier who leaves the safe confines of his or her fortification.

In embodiments, the Access Control Engine evaluates situational characteristics, and then provides an operational request (e.g., encode or decode, protect or unprotect, etc. as examples). In embodiments, its evaluation is in conjunction with and interfaces with the SDF processor.

Also, in embodiments, for the Access Control Engine to allow access and control, it receives input from other components. In embodiments, the system allows data to apply an enforcement mitigation upon itself based on policy information within a data file and meta-data. This enforcement mitigation may be manifest in many ways and in several scenarios based on factors. Enforcement mitigation may include, for example: access to a file must be through a container when on a mobile device or an unmanaged device; access to a file must be through a Virtual Private Network (VPN) connection; access to a file must be through a secure web browser; access to a file is read only; access to a file must be when a certain application is present or not present; access to a file must be when certain hardware requirements are met; access to a file must be within a given location; and access to a file must be with a given user(s).

In embodiments, the Access Environmental Control is responsible for carrying out the access control directives determined appropriate by the ACE component. In embodiments, this logic may be embodied in the secure access application which constrains the user experience to the confines of a single, user mode application. Or, in embodiments, it may be implemented as part of system software which would control access through the device's operating system using file system filter drivers, network filter drivers, system services, shell extensions, and the like.

Consider the following example. Given that one of the components that supplies information to the ACE 320 is the system instrumentation (SI) 325, the SI 325 may assess one or more current environment factors, such as, location. The policy that the Access Control Engine received from the Extensible Content Transformation that is wrapped around the data, where it was read by the Secure Data Format Processor might include a policy that states, "If this data can only be opened within the geographical location of the United States." Thus, the System Instrumentation 325 informs the Access Control Engine 320 of the current location and this information can be used in the determination whether to grant access. If the file is on a computer in Austin, Tex., then the user is allowed to open the file, but if the computer is in Montreal, Quebec, Canada, then the Access Control Engine ascertain that this policy is violated and will not allow to access in that environment.

It should be noted that many environmental factors may be used for the situational awareness, such as BIOS data properties, operating system (OS) data properties, network access, hardware properties, etc. In embodiments, for analysis of directive, the Access Control Engine may interface with components of the SDAS in a bidirectional manner—receiving data and making requests to the instrumentation for data. For example, it may ask for policies and rules from the policies and rules component 360, from the SDAS management server 375, or both. Thus, if there is any policy change, the Access Control Engine ask the appropriate system instrumentation component for data related to the new policy (e.g., Is the contextual environment in compliance or out of compliance with the new policy?).

6. Access Environment Control (AEC)

In embodiments, the access environment control (AEC) 330 component of the system 310 is communicatively coupled to the Access Control Engine (ACE) 320 and is responsible for carrying out the access control directives determined appropriate by the ACE 320 component. In embodiments, this logic may be embodied in a secure access application, which constrains the user experience to the confines of a single, user mode application. Alternatively, this access control may be implemented as part of the system software, which controls access through the device's 305 operating system using file system filter drivers, network filter drivers, system services, shell extensions, etc.

Consider, by way of illustration only, the following example. Assume that the file has a policy to restrict opening when outside the U.S. and the file is outside the U.S. One or more policies may allow certain restricted access when outside the U.S. For example, the policy may not allow the user to open the file locally, but may allow one or more options, such as: (1) allow the user to open, via a secure browser, the file stored at a secure datacenter; (2) allow the user to open the file via a container on that endpoint so that it is contained within an environment to prevent data leaks; (3) allow the user to open the file but grant read-only access (no printing, saving, sending, etc.); or the like. Or, a policy may state that if the file is outside the United States, destroy the file. Thus, in embodiments, the Access Control Engine receive the policies/rules and data from the system instrumentation. Based upon that, in embodiments, the ACE 320 obtains the different access environment controls from the AEC 330 that are available on that endpoint. For example, if the endpoint does not have a secure browser or does not have a container, the ACE may limit access to what the endpoint does have that is acceptable; and if there is no acceptable option, the ACE may not allow access. It shall be noted that many different access environment controls may be used. It shall also be noted that one important benefit of such embodiments of the system is that they provide the power of saying more than just "yes" and "no" under these constraints and circumstances. In the past, prior systems either decrypted the file or kept it encrypted—simple binary results. Here, a range of options may be available based upon the particular environmental/situations circumstances. Finally, it shall also be noted that these varied options may also be order or ranked according to preference of use when one or more are available to the SDAS 310 when granting access to a file.

7. System Instrumentation

In embodiments, to deliver—for the purposes of assessing the given security threat environment of the data at its current location, access environment, and exposure—the environmental situational awareness, the system leverages system instrumentation 325 to read targeted measurements as indicated by one or more access rules/policies. Thus, in embodiments, one or more instrumentation 325 components may be communicatively coupled to the access control engine (ACE) 320 and may also be communicatively coupled to the access environmental control component 330.

Examples of targeted situational/contextual measurements may include sensor data (e.g., GPS readings, video and/or audio data of the current surroundings), BIOS data/properties, OS data/properties, network access data/properties, and other hardware or software data/properties. In embodiments, the ACE 320 makes requests for instrumentation readings based on analysis of the policy servers' directives (e.g., policies stored in module 360 and/or server 375, given the connected environment of the target. In embodiments, a priority may be set between sources of policies. For example, in embodiments, policies in the server 375 may be defined to trump or even overwrite the policies in policy/rules module 360.

8. Security Services Component (SSC)

In embodiments, a security services component (SSC) 335, which may be communicatively coupled to the secure data format processor 315 and to the one or more extensible content transformation components 340, provides operational and data management related to security operations. In embodiments, these security operations may include cryptographic functionality, key material management, validation, etc. In embodiments, the SSC 335 may communicate with a remote server (not shown) for security-related services, such as key requests.

9. Policy/Rules Component

In embodiments, the policy/rules component 360 is communicatively coupled to the SDAS management server 375 and acquires and caches policies, rules, and settings from the server 375. It should be noted that examples of policies may include controls related to network access allowances, data sensitivity allowances (classification access rules, e.g. user can access data rated as secret), and the like.

In embodiments, policies may be embedded directly into the SDF file metadata itself or a reference via unique ID may be embedded in place of the actual policy. In the latter embodiment, at the time of file access, the unique ID would be sent to the server (e.g., SDAS management server 375) to retrieve the current policy.

Multiple copies may exist of this file (e.g., via network shares, sent via email, or stored on cloud storage). In embodiments, if the policy is embedded into the file, then this embedded policy may only be updated at certain times (e.g., when a new copy of the document is saved, because the policy is retrieved from the server at that time). Although in embodiments, the system may be configured to update the embedded policy at different times such a when attempting to be access, at various intervals, or under other conditions. With embedded policies, older copies of this file would still contain the old policy if no update condition is triggered.

In cases in which a unique policy reference ID is embedded, it forces the reader application to retrieve the most current policy from the server at the time of access. This allows users (e.g., administrators) to change the policy for a file in the middle of its lifecycle and have that affect how that data is treated going forward.

In embodiments, polices/rules may have priority or precedence levels associated with them to define precedents of when to update or what policies/rules should trump others.

10. AASC—Authentication/Authorization Services Component

In embodiments, the SDAS system 310 also comprises an authentication (AuthN) and authorization (AuthZ) services component (AASC) 335 to provide operational authentication and authorization services. It shall be noted that authentication and authorization services are well known in the art and that any such services may be employed herein.

11. Audit Services

In embodiments, an audit services component 345 may be communicatively coupled to the SDFP 315 and provide audit services for the SDAS 310. For example, in embodiments, the audit services component 345 provides operational audit alerts for the use and incorporation into security operations whereby giving the proactive conditions set forth by the SDAS 310. For example, in embodiments, these operational audit alerts allow the Intelligence Management 370 to then aggregate and correlate the alerts to produce a predictive condition or conditions measurements thus providing possible insight into future behaviors of a target.

In embodiment, because of the instrumentation data, the access control environment, the policy rules that are around the access control engine, and other information available from the SDAS, alerts from the SDAS can leverage this information and incorporate aspects of it into security operations—both for historic and proactive/predictive condition. For example, in embodiments, the audit services allows an administrator to see what the data is doing and report back all the transactions and experiences to the intelligence management 370 and/or SDAS management server 375.

12. Intelligence Management Services

In embodiments, the SDAS system may be communicatively coupled to intelligence management services 370. In embodiments, the intelligence management 370 can aggregate and correlate alerts to produce predictive conditions measurements, thus providing possible insight into future behaviors of a target.

13. Security Module

In embodiments, the SDAS system includes a security module 350 communicatively coupled to the access control engine 320 and may also be communicatively coupled to the trusted supply chain module 365. In embodiments, the security module 350 provides one or more security services, such as credentialing participants, screening and/or validating contents of data and tamper-proof certificates.

14. Trusted Supply Chain

In embodiments, a trusted supply chain component 365 is communicatively coupled to the secure data access system 310 or may be a component of the system 310. In embodiments, the trusted supply chain component 365 provides run-time instrumentation and root-of-trust implementation. In embodiments, this provides a set of instructions in the trusted platform module that is always trusted by the computers operating system. In embodiments, this component with the set of instructions serves as a separate compute engine controlling the trusted platform.

In embodiments, the trusted supply chain represents an ability to have a root of trust from a firmware and chip perspective on the endpoints. For example, if a protected file—a file with a policy—arrives on a laptop, that laptop hardware can adapt to the security policy of the file while that file is resident on that laptop. Thus, in embodiments, the SDAS 305 can interface with system components in the OS, firmware, and hardware components to effect changes in the devices functionality.

Consider a laptop, with a secure data access system, that is typically not used for working with sensitive data. If a sensitive file arrives with a policy and rules indicating that it is sensitive and must be treated in a particular way and/or exists in a particular environment, the SDAS via the trusted supply chain 365 can have the laptop adopt the security level of that file while it is resident on the laptop. Thus, the hardware can actually adopt the sensitivity of the file. For example, wireless access, Bluetooth, networking functions may be curtailed, USB port access may be restricted, etc.

The trusted supply chain 365 allows company devices to automatically configure themselves to the appropriate security level based on the resident data. Thus, when no sensitive information is on the endpoint device, it can maintain a default security setting. But, when a protected data file is put onto the device, the system senses the arrival of that protected data and puts itself into an appropriate security mode while that data is resident.

It should also be noted that, in embodiments, any policy may be implemented, including ones that vary based on the inputs such as from the system instrumentation 325, the ACE 330, etc. For example, the access environment control 330 may assess that the laptop is physically inside of the secured corporate network and the user may therefore be allowed to view any document while in that state. But, if the laptop is now connected to a coffee shop's Wi-Fi, access to the files may be completely restricted.

By way of further example, in normal mode, the laptop may connect to the coffee shop's Wi-Fi and allow a VPN. But when a protected file is resident on it, the laptop adopts the policy of that file and may indicate to the user, "VPN is no longer an option. This laptop may only communicate to the networks of Corporation D campus while this data is resident."

It should be noted that a significant benefit to this system is the implementation. Because the security follows the file, the device matches the appropriate level if the file is present. Thus, government agencies and corporations need not worry about how large numbers of devices are configured and where data is going, and on which devices. Using aspects disclosed herein, if the data appears on a system, that system configures itself to the desired policy level.

Additional functionality and interoperation of the above-listed components in FIG. 3 is provided in the following example method embodiments.

C. Method Embodiments

Embodiments of the present invention comprise computer-implemented methods for protecting a data file no matter where it resides or travels. In embodiments, the protection may be accomplished, at least in part, by generating a protected data file that includes the data file in an encrypted format and metadata, which comprises information regarding one or more policies/rules related to situational conditions under which access to the data file may be granted. To access the data file within the protected data file, situational factors as set in the policies must be met. For example, who, what, where, when, and how questions (which individually or collectively) may be formed into one or more policies and must be satisfied in order to access the native data.

In embodiments, given a protected data file, computer-implemented methods for accessing content of a protected file on a computing device may comprise several steps. For example, when an access request (e.g., to read, to write, or both) is made by a user of a computing device, the computing device may obtain from a memory one or more policies related to contextual conditions under which access to a user-accessible format of the content of the encrypted payload may be granted. The policies may be embedded in the metadata of the protected file or may only be securely associated with the protected file and obtained from a data store. In embodiments, the one or more policies related to the context or situations under which access rights may be granted. Accordingly, the user's computing system obtains the relevant contextual data. The computing system applies the collected contextual data to the one or more policies to identify what access level or levels are appropriate in that setting. In embodiments, a mitigation access level or levels may be allows (e.g., decrypting the data on the user's system may not be allowed, but the user may be allowed to securely access the content via a VPN to a secure server).

In embodiments, the situational or contextual data may involve collecting, by way of example, clock data, location data, BIOS data, operating system data, file system data, network data, connectivity data, security features data, user data, authentication data, user privileges data, software data of the computing device, and hardware data of the computing device.

In embodiments, the protected data file may be or have nested levels of encryption and/or metadata, and may undergo iterations of application of policies/rules to determine access rights.

Figure 4:
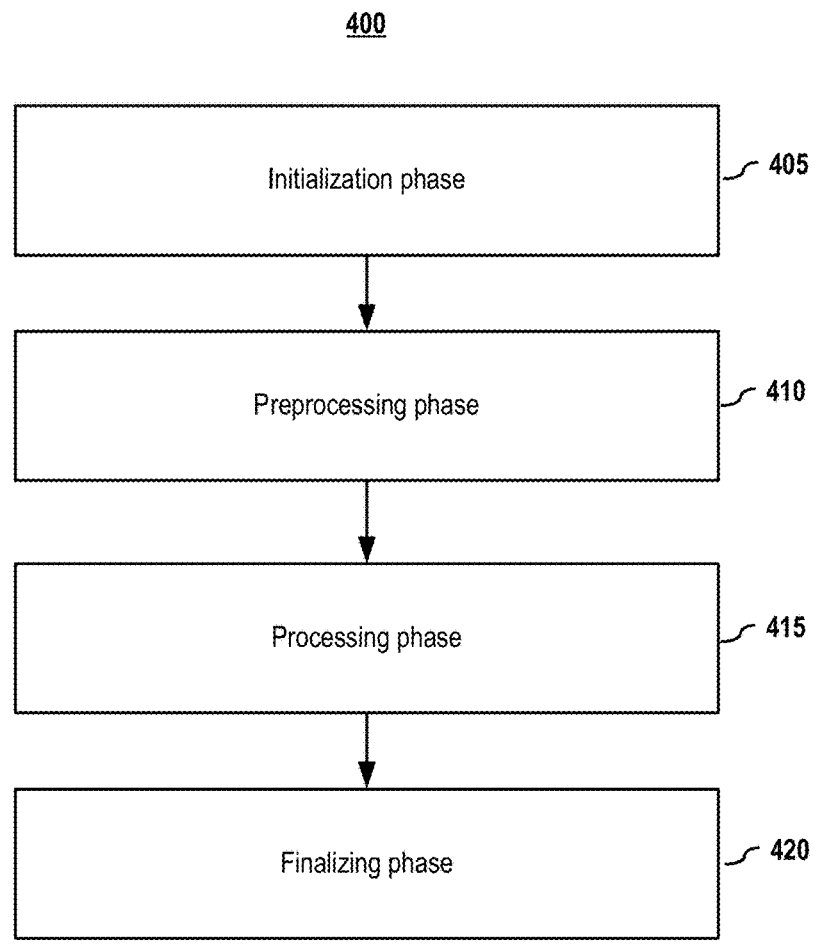
FIG. 4 depicts a general phases of the Secure Data Access System (SDAS) according to embodiments of the present invention.

FIG. 4 depicts a general phases of the Secure Data Access System (SDAS) according to embodiments of the present invention. These are examples of phases the system may undergo when, for example, a user wishes to collaborate with a colleague who sent a protected document. As shown in FIG. 4, the four main phases are: (1) initialization (405); (2) preprocessing (410); (3) processing (415); and (4) finalizing (420). Embodiments of each of these phases are described in more detail below.

1. Phase 1'Initialize

Figure 5:
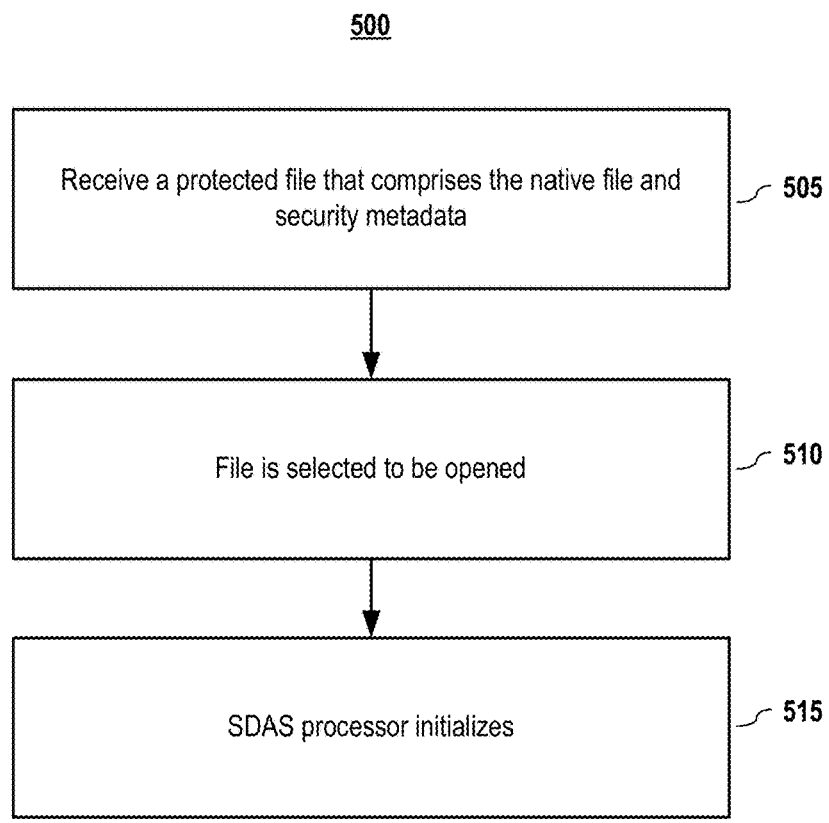
FIG. 5 depicts the initialization phase according to embodiments of the present invention.

FIG. 5 depicts the initialization phase according to embodiments of the present invention. In the embodiment depicted in FIG. 5, the method commences with the user receiving (505) a protected file (e.g., file_name.sdf) such as via email and saves it to a local folder. In embodiments, the user selects (510) the file for opening. For example, the user may use Windows® File Explorer to open the file's location and select or click on the file to request that it be opened. The operating system has associated .SDF files with the SDAS application; therefore, it launches the SDAS application and supplies file_name.sdf as a parameter to the application. In embodiments, upon launch, the SDAS application initializes (515); embodiments of the application initialization are depicted in FIG. 6.

Figure 6:
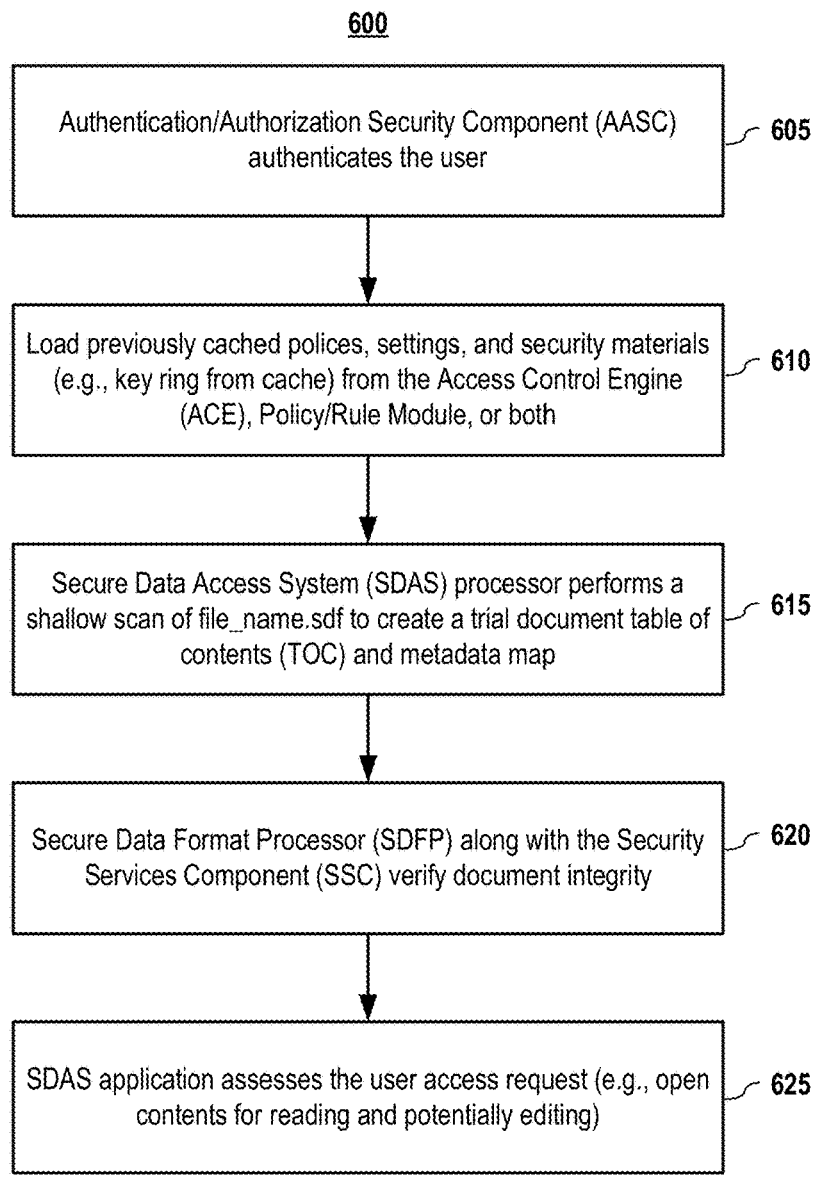
FIG. 6 depicts SDAS application initialization according to embodiments of the present invention.

FIG. 6 depicts SDAS application initialization according to embodiments of the present invention. In the embodiment depicted in FIG. 6, the process commences with the Authentication/Authorization Security Component (AASC) 335 authenticating (610) the user. Authentication and authorization methods are well-known in the art and any such methods may be used. In embodiments, the SDAS processor 315 loads previously cached policies, settings, and security materials (e.g., key ring from cache). In embodiment, this information may be loaded from the ACE module 320, the policy/rules 360 (which may receive updates from the SDAS management server 375), or a combination thereof.

In embodiments, the Secure Data Access System (SDAS) processor 315 performs (615) a shallow scan of the file (e.g., file_name.sdf) to create a trial document table of contents (TOC) and metadata map. In embodiments, included in the TOC and metadata map may be environmental context like who (user identity), what (device context), when (time), and where (geo location). Also, in embodiments, the Secure Data Format Processor (SDFP) 315 along with the Security Services Component (SSC) 335 verify document integrity, such as by using checksums. Finally, as depicted, the SDAS application assesses the user access request (e.g., in this case, to open contents for reading and potentially editing).

2. Phase 2—Preprocessing

Figure 7:
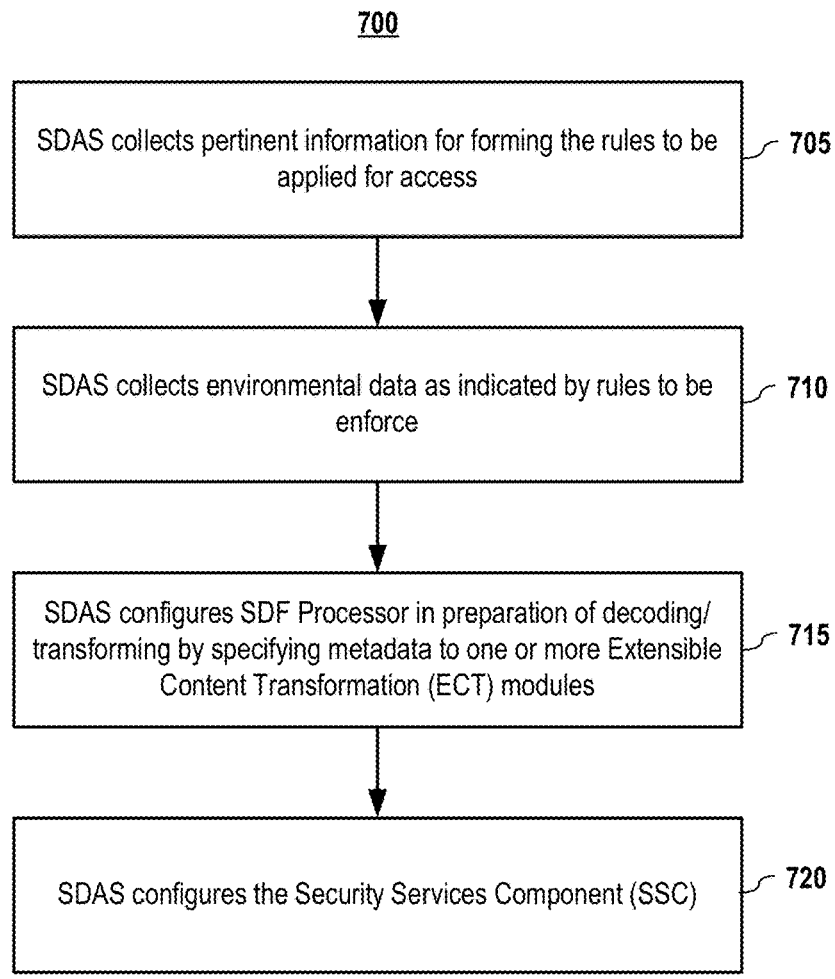
FIG. 7 depicts preprocessing phase according to embodiments of the present invention.

FIG. 7 depicts a preprocessing phase according to embodiments of the present invention. In embodiments, the SDAS application collects (705) pertinent information for forming the rules to be applied for access. For example, in embodiments, the SDAS application may select related policies already on device that were obtained during initialization. Alternatively or additionally, in embodiments, the SDAS application may ask the SDAS management server 375, via the policy/rules component 360, for any policy updates since last check-in. In embodiments, the rules specified in the metadata within the file (e.g., file_name.sdf) may also be included.

In embodiments, the SDAS application collects (710) environmental data as indicated by rules to be enforced. Potential contextual/environmental data includes: clock information, location via GPS or wireless information, BIOS data, operating system (OS) data, file system information, network information, etc. In embodiments, this information may be obtained by the system instrumentation component 325, from instrumentation services like Dell Data Vault (DDV) or Windows Management Instrumentation (WMI), or a combination thereof. In embodiments, the environmental data may also include items related to the user potential identity, LDAP/AD attributes, attestations, privileges level, and the like. In embodiments, the AuthN/Z security component 355 may help supply some of this information.

Returning to FIG. 7, in embodiments, the SDAS application configures the SDF processor 315 in preparation of decoding/transforming by specifying metadata to one or more Extensible Content Transformation (ECTs). In embodiments, if one or more particular ECTs that are to be used in decoding/transforming the file as specifying in metadata are not present in the SDAS, the system can download, install, and configure them from a server via one or more server interfaces.

In embodiments, the SDAS application also configures (720) the Security Services Component (SSC) 335. For example, in embodiments, based on the metadata associated with the file, scan key IDs are searched in a local key ring. Responsive to the keys not being found, the system 310 may ask a server 375 for the appropriate key(s) and store on key ring and/or save to a cache.

3. Phase 3—Processing

Figure 8:
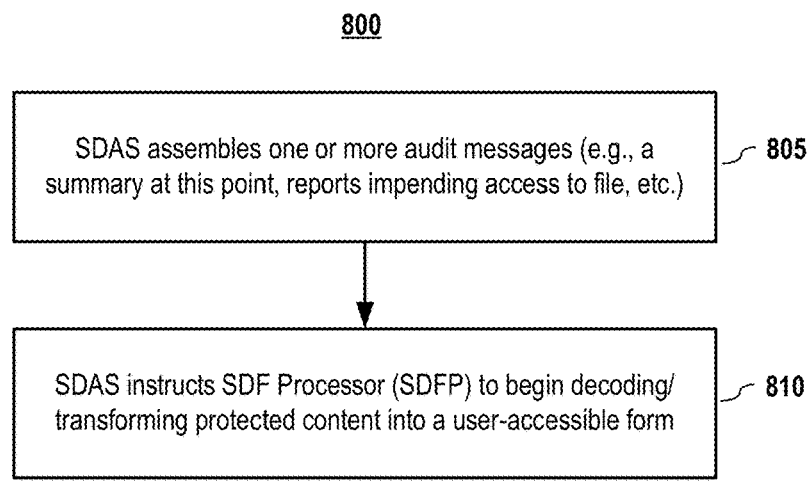
FIG. 8 depicts processing phase according to embodiments of the present invention.

FIG. 8 depicts processing phase according to embodiments of the present invention. In embodiments, the SDAS application assembles (805) one or more audit messages, which messages may include a summary at this point in the process and reports impending access to the file. In embodiments, the system 310 sends one or more of the audit messages, via the Audit Services component 345, to the intelligence management server 370. It shall be noted that the audit messages may serve a number of functions, including maintaining an audit trail and allowing intelligence management system, the SDAS management server, or both to intervene before the file is opened.

In embodiments, responsive to the complying with the applicable rules/policies (e.g., correct user authentication, proper environmental factors, etc.), the SDAS application instructs (810) the SDF Processor (SDFP) 315 to begin decoding/transforming the protected content of the file (e.g., file_name.sdf) into a user-accessible form. It shall be noted that the intermediate results are handled securely so there is no opportunity for leakage to occur until finalization approves it. In embodiments, intermediate results relate to a process whereby the SDAS verifies accessibility prior to access. In embodiments, in order to verify accessibility, the system opens portions of the document to render a result, and it is in this situation that, in order to render results, the intermediate results are handled security so that no leakage or man-in-the middle attacks may be accomplished. In embodiments, the SDF Processor 315 streams or filters the encoded payload to the appropriate ECT Processor or Processors 340 for the decoding/transforming, the results of which are returned to the SDF Processor 315. In embodiments, if the results are encoded, then the process is repeated until final, untransformed results are achieved.

It should be noted that embodiments of the present invention may include nested layers of security for a file. In embodiments, the ECT Processor decoding may return additional metadata and rules. In such cases, the SDF Processor 315 adds those new policies/rules to the previously configured working policies/rules set for use in subsequent process and enforcement. In embodiments, if needed, the SDAS application will make additional requests for data, such as instrumentation reading for newly realized environmental constraints.

4. Phase 4—Finalize (Enforcement, Result)

Figure 9:
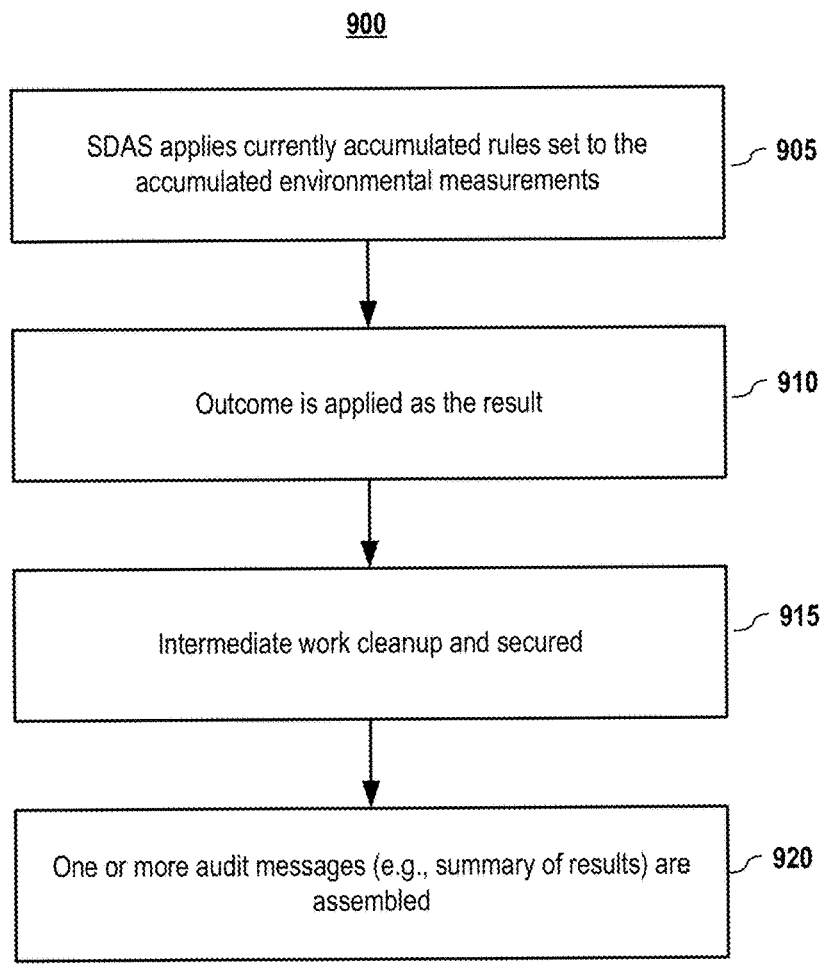
FIG. 9 depicts finalization phase according to embodiments of the present invention.

FIG. 9 depicts finalization phase according to embodiments of the present invention. In embodiments, the SDAS application applies currently accumulated rules set to the accumulated environmental measurements. For example, the policy questions, such as (by way of example only): who is trying to access the file?, what are they trying to access?, when?, on what computing system are they trying to access the file?, where is the computing system and file currently located?, how are they trying to access or use the file?, etc., are answered (905) and tested for compliance with the gathered data.

The outcome of this determination is then applied (910) as the result. In embodiments, if access is allowed, a usable version of the file contents are delivered to the requestor 380, or a representation of the data content may be delivered, based on the access allowance determination. In embodiments, mitigations and/or remediation may be applied. For example, depending upon the gathered data conditions and policies, the system may delete some or all of the date, wipe some or all of the data from the system, execute a kill-pill, containerize the data, sandbox the application and data, require the data to be securely accessed via an virtual private network (VPN), etc.

In embodiments, intermediate work cleanup is performed and the data is secured. In embodiments, intermediate work may be defined as any set of resultant policies that may overlap and therefore need to be referred to the SDAS management server 375 for execution of prioritized mitigation.

Finally, in embodiments, the SDAS application assembles one or more audit message with summary of results that may be transmitted to the intelligence management server 370 for logging and other purposes.

D. Exemplary Systems Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 11:
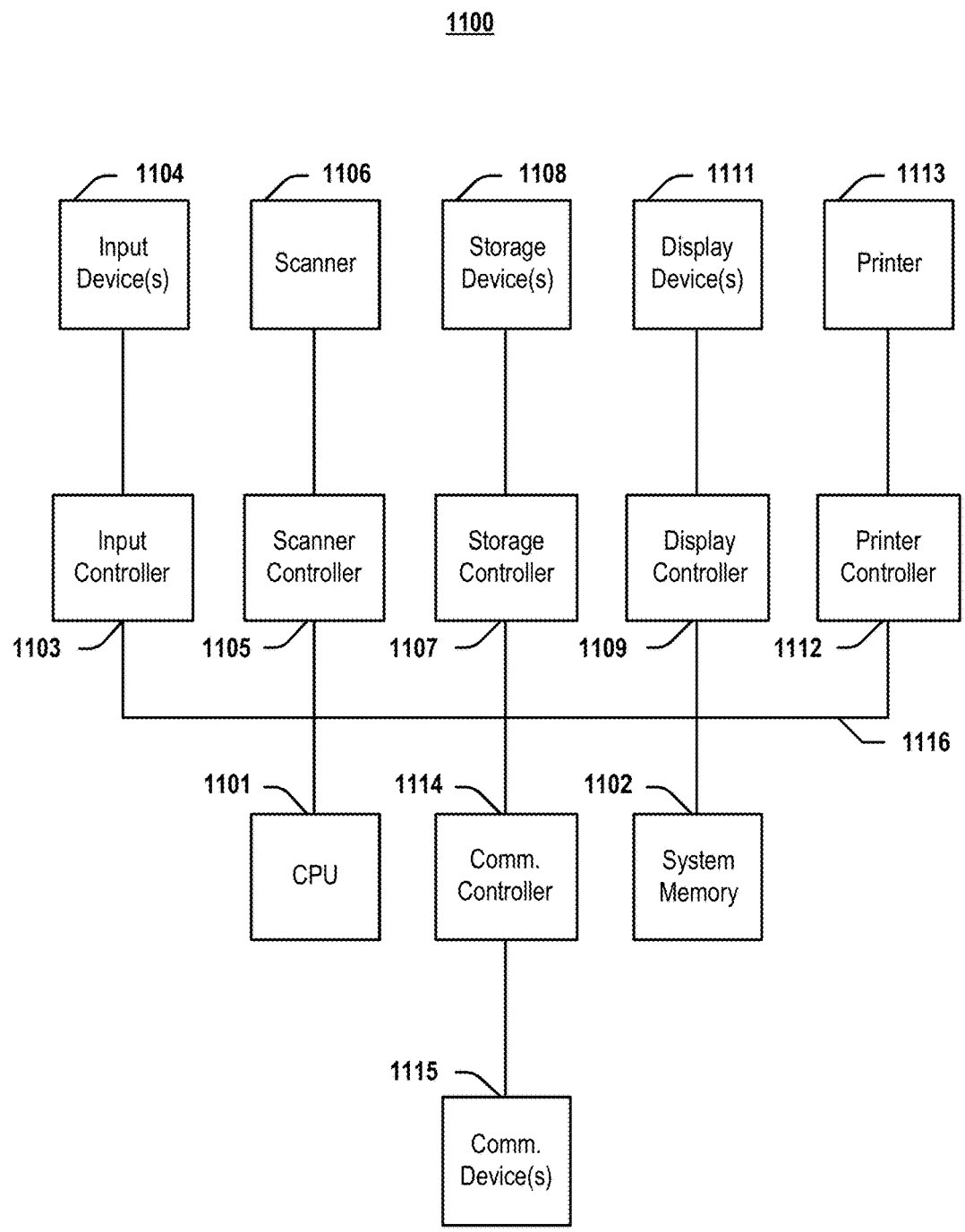
FIG. 11 depicts a simplified block diagram of an information handling system according to embodiments of the present invention.

FIG. 11 depicts a block diagram of an information handling system 1100 according to embodiments of the present invention. It will be understood that the functionalities shown for system 1100 may operate to support various embodiments of an information handling system—although it shall be understood that an information handling system may be differently configured and include different components. As illustrated in FIG. 11, system 1100 includes a central processing unit (CPU) 1101 that provides computing resources and controls the computer. CPU 1101 may be implemented with a microprocessor or the like, and may also include a graphics processor and/or a floating point coprocessor for mathematical computations. System 1100 may also include a system memory 1102, which may be in the form of random-access memory (RAM) and read-only memory (ROM).

A number of controllers and peripheral devices may also be provided, as shown in FIG. 11. An input controller 1103 represents an interface to various input device(s) 1104, such as a keyboard, mouse, or stylus. There may also be a scanner controller 1105, which communicates with a scanner 1106. System 1100 may also include a storage controller 1107 for interfacing with one or more storage devices 1108 each of which includes a storage medium such as magnetic tape or disk, or an optical medium that might be used to record programs of instructions for operating systems, utilities and applications which may include embodiments of programs that implement various aspects of the present invention. Storage device(s) 1108 may also be used to store processed data or data to be processed in accordance with the invention. System 1100 may also include a display controller 1109 for providing an interface to a display device 1111, which may be a cathode ray tube (CRT), a thin film transistor (TFT) display, or other type of display. The computing system 1100 may also include a printer controller 1112 for communicating with a printer 1113. A communications controller 1114 may interface with one or more communication devices 1115, which enables system 1100 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for accessing a file on a computing device, the method comprising:
    receiving a request to access a payload of the file, the file comprising the payload in an encrypted format and metadata, the metadata comprising information related to one or more policies regarding one or more enforcement mitigations under which usable access to the payload is granted and mitigates security risks to the payload and which granting access to the payload via an enforcement mitigation is determined by the computing device independent of any third-party computing device, the metadata further comprising a set of operations in a set order that is associated with one or more extensible content transformation modules, the one or more extensible content transformation modules providing one or more extensible transformative capabilities that are used by a secure data format processor according to the set order to decode the encrypted payload into a user-accessible format;
    using one or more components of the computing device to obtain situational data about the file that is relevant to the one or more policies;
    applying at least one or more data of the situational data to the one or more policies to identify one or more enforcement mitigations that are available to be used to grant usable access to the payload; and
    granting, via the computing device, usable access to the payload using at least one of the identified enforcement mitigations.

2. The computer-implemented method of claim 1 wherein the step of using one or more components of the computing device to obtain situational data about the file that is relevant to the one or more policies comprises:
    collecting one or more situational data as indicated by the one or more policies, the situational data comprising at least one or more of clock data, location data, BIOS data, operating system data, file system data, network data, connectivity data, security features data, user data, authentication data, user privileges data, software data of the computing device, and hardware data of the computing device.

3. The computer-implemented method of claim 1 wherein the metadata comprising the information related to one or more policies regarding one or more enforcement mitigations under which access to the payload in an unencrypted format is granted and mitigates security risks to the payload comprises:
    the one or more policies or one or more identifiers for accessing the one or more policies from a policy dataset.

4. The computer-implemented method of claim 3 further comprising:
obtaining from a data storage the one or more policies.

5. The computer-implemented method of claim 4 wherein the step of obtaining from a data storage the one or more policies comprises:
obtaining the one or more policies from the metadata of the file, from a policy dataset, or both.

6. The computer-implemented method of claim 5 wherein the policy dataset is obtained from at least one of:
a policy module on the computing device; and
a secure data access system management server that is communicatively coupled to the computing device.

7. The computer-implemented method of claim 1 wherein:
the step of applying at least one or more data of the situational data to the one or more policies to identify one or more enforcement mitigations that are available to be used to grant usable access to the payload comprises determining that no access is appropriate given the situational data and the one or more policies associated with the file; and
the step of granting, via the computing device, usable access to the payload using at least one of the identified enforcement mitigations comprises not granting access to the payload in the unencrypted format.

8. The computer-implemented method of claim 1 wherein the step of granting, via the computing device, usable access to the payload using at least one of the identified enforcement mitigations further comprising:
taking one or more actions, according to the at least one of the identified enforcement mitigations, to affect one or more conditions of the computing device to increase security for accessing the payload.

9. The computer-implemented method of claim 8 further comprising:
responsive to the payload comprising a nested payload and additional metadata identifying one or more additional policies related to conditions under which access are available to be granted to the nested payload, analyzing the one or more additional policies;
collecting, if needed for the one or more additional policies, additional situational data relevant to the one or more additional policies; and
applying at least one or more data of the situational data, additional situational data, or both to the one or more additional policies to identify one or more enforcement mitigations that are available to be used to grant access to the nested payload.

10. A system for applying an enforcement mitigation for accessing a protected file, the system comprising:
a memory that stores the protected file, the protected file comprising a payload that has been encrypted and metadata, the metadata comprising information related to one or more policies regarding one or more enforcement mitigations under which usable access to the payload is granted and which granting access to the payload via an enforcement mitigation is determined by the system independent of any third-party computing device, the metadata further comprising a set of operations in a set order;
a secure data format processor that coordinates system components to determine which of one or more enforcement mitigations are available for the protected file and applies an identified enforcement mitigation;
an access control engine that is communicatively coupled to the secure data format processor and identifies one or more enforcement mitigations that are appropriate based, at least in part, upon applying a set of situational data regarding the protected file to the one or more policies;
one or more extensible content transformation modules, communicatively coupled to the secure data format processor that are associated with the set of operations included in the metadata and provide one or more extensible transformative capabilities to the secure data format processor, the one or more transformative capabilities being used by the secure data format processor according to the set order as identified in the metadata to decode the payload into a usable format;
a policy/rules module, communicatively coupled a secure data access system management server and to the access control engine, that stores or acquires the one or more policies; and
an access environmental controls module, communicatively coupled to the access control engine, that applies one or more access control directives of the one or more enforcement mitigations determined to be appropriate by the access control engine for granting usable access to the payload.

11. The system of claim 10 wherein the set of situational data regarding the protected file comprises a set of access controls available on the system which are received by the access controls engine from the access environmental controls module.

12. The system of claim 11 wherein the access control engine identifies the one or more enforcement mitigations that are appropriate based, at least in part, upon applying a set of situational data regarding the protected file by performing the steps comprising:
obtaining the set of situational data regarding the protected file comprising the set of access controls from the access environmental controls module that are available for the system;
determining the one or more enforcement mitigations that are appropriate for the system based, at least in part, on the set of situational data; and
providing the one or more access control directives to the access environmental controls module to apply an appropriate security for granting usable access to the payload.

13. The system of claim 11 wherein the one or more access control directives comprises:
responsive to the system having a level of security below a first threshold, granting usable access via a secure browser to a copy of the payload stored at a secure datacenter.

14. The system of claim 11 wherein the one or more access control directives comprises:
responsive to the system having a level of security below a second threshold, granting usable access to the payload via a container on the system so that the payload is contained within an environment to prevent data leaks.

15. The system of claim 11 wherein the one or more access control directives comprises:
responsive to the system not meeting a minimum threshold level of security, having the system destroy the protected file.

16. A non-transitory computer-readable medium or media comprising one or more sequences of instructions which, when executed by at least one processor of a computing device, causes steps to be performed for providing one or more of a plurality of access levels to a protected file, the steps comprising:

receiving a request to access a payload of the file, the file comprising the payload in an encrypted format and metadata, the metadata comprising information related to one or more policies regarding one or more enforcement mitigations under which usable access to the payload is granted and mitigates security risks to the payload and which granting access to the payload via an enforcement mitigation is determined by the computing device independent of any third-party computing device, the metadata further comprising a set of operations in a set order that is associated with one or more extensible content transformation modules, the one or more extensible content transformation modules providing one or more extensible transformative capabilities that are used by a secure data format processor according to the set order to decode the encrypted payload into a user-accessible format using one or more components of the computing device to obtain situational data about the file that is relevant to the one or more policies;

applying at least one or more data of the situational data to the one or more policies to identify one or more enforcement mitigations that are available to be used to grant usable access to the payload; and granting, via the computing device, usable access to the payload using at least one of the identified enforcement mitigations.

17. The non-transitory computer-readable medium or media of claim 16 wherein the step of using one or more components of the computing device to obtain situational data about the file that is relevant to the one or more policies comprises:

collecting one or more situational data as indicated by the one or more policies, the situational data comprising at least one or more of clock data, location data, BIOS data, operating system data, file system data, network data, connectivity data, security features data, user data, authentication data, user privileges data, software data of the computing device, and hardware data of the computing device.

18. The non-transitory computer-readable medium or media of claim 16 wherein:

the step of applying at least some of the situational data to the one or more policies to identify one or more enforcement mitigations that are available to be used to grant usable access to the payload comprises determining that no access is appropriate given the situational data and the one or more policies associated with the file; and the step of granting, via the computing device, usable access to the payload using at least one of the identified enforcement mitigations comprises not granting access to the payload in the unencrypted format.

19. The non-transitory computer-readable medium or media of claim 16 wherein the step of granting, via the computing device, usable access to the payload using at least one of the identified enforcement mitigations further comprising:

taking one or more actions, according to the at least one of the identified enforcement mitigations, to affect one or more conditions of the computing device to increase security for accessing the payload.

20. The computer-implemented method of claim 1, wherein, responsive to the computing device not having a transformative capability identified in the set of operations in the metadata, obtaining an extensible content transformation module that provides the transformative capability, in which the secure data format processor verifies that the extensible content transformation module is a trusted module.

* * * * *